INVENTOR.
LOUIS PELLECCHIA
BY Arthur L. Bowers
AGENT
Max H. Garmer
ATTORNEY

INVENTOR.
LOUIS PELLECCHIA
BY Arthur L Bowers
AGENT
Max L Garmer
ATTORNEY

Aug. 6, 1968 L. PELLECCHIA 3,396,321
SYNCHRO SYSTEM HAVING SINGLE AND MULTIPLE
SPEED TRANSMITTERS AND RECEIVERS
Filed Oct. 2, 1964 7 Sheets-Sheet 3

INVENTOR.
LOUIS PELLECCHIA
BY Arthur L. Bowers
AGENT
Max L. Libman
ATTORNEY

INVENTOR.
LOUIS PELLECCHIA
BY Arthur L. Bowers
AGENT
Max H. Parmer
ATTORNEY

INVENTOR.
LOUIS PELLECCHIA
BY Arthur L. Bowers
AGENT
Max H. Farmer
ATTORNEY

Aug. 6, 1968 L. PELLECCHIA 3,396,321

SYNCHRO SYSTEM HAVING SINGLE AND MULTIPLE SPEED TRANSMITTERS AND RECEIVERS

Filed Oct. 2, 1964 7 Sheets-Sheet 6

INVENTOR.
LOUIS PELLECCHIA
BY Arthur L. Bowers
AGENT
Max H. Lerner
ATTORNEY

INVENTOR.
LOUIS PELLECCHIA
BY Arthur L. Bowers
AGENT
Max L. Sarner
ATTORNEY 3,396,321

SYNCHRO SYSTEM HAVING SINGLE AND MULTIPLE SPEED TRANSMITTERS AND RECEIVERS

Louis Pellecchia, Brooklyn, N.Y., assignor to the United States of America as represented by the Secretary of the Navy Filed Oct. 2, 1964, Ser. No. 401,280
4 Claims. (Cl. 318—24)

ABSTRACT OF THE DISCLOSURE

A synchro system employing a one-speed and a plural-speed transmitter whose rotors are geared to one input shaft, a one-speed and a plural speed receiver electrically coupled to the one-speed and plural-speed transmitters respectively, and are electrically coupled to servoing means and whose rotors are geared to the servoing means and to one output shaft.

The invention described herein may be manufactured and used by or for the Government of the United States of America for governmental purposes without the payment of any royalties thereon or therefor.

This invention relates to improvements in synchros and synchro systems for effecting much more accurate transmission of angular data. Additionally, this invention relates to synchros having multiple pairs of poles and that are compact and lightweight.

An object of this invention is to provide synchros and synchro systems with greater accuracy than heretofore and more particularly with an accuracy on the order of a few seconds of arc.

A further object is to minimize deleterious effects on synchro performance produced by self-induced temperature rise and by ambient temperature change.

A further object is to provide a position angle transmission system wherein the receivers exhibit high accuracy stability as the load on the transmitter synchro changes.

A further object is to provide synchros for operation at supply voltage levels and relative impedance levels that are suited for optimum protection from transmission line imbalances and coupling effects.

A further object is to provide multiple synchros having the smallest outside diameter for a predetermined number of pole pairs and the maximum number of pole pairs for a selected outside diameter.

Other objects and advantages will appear from the following description of an example of the invention, and the novel features will be particularly pointed out in the appended claims.

Figure 3:
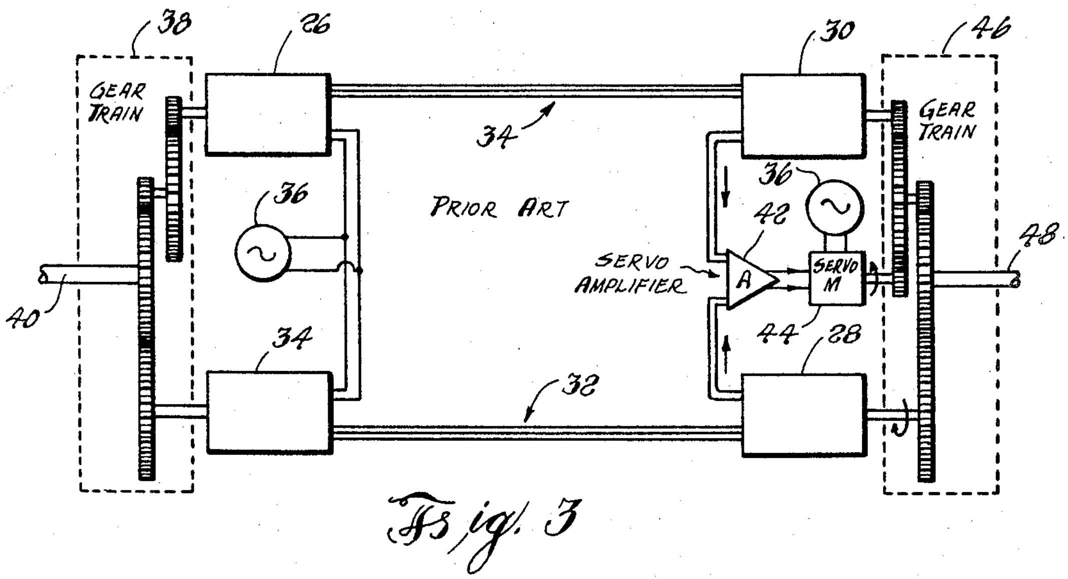
Figure 4:
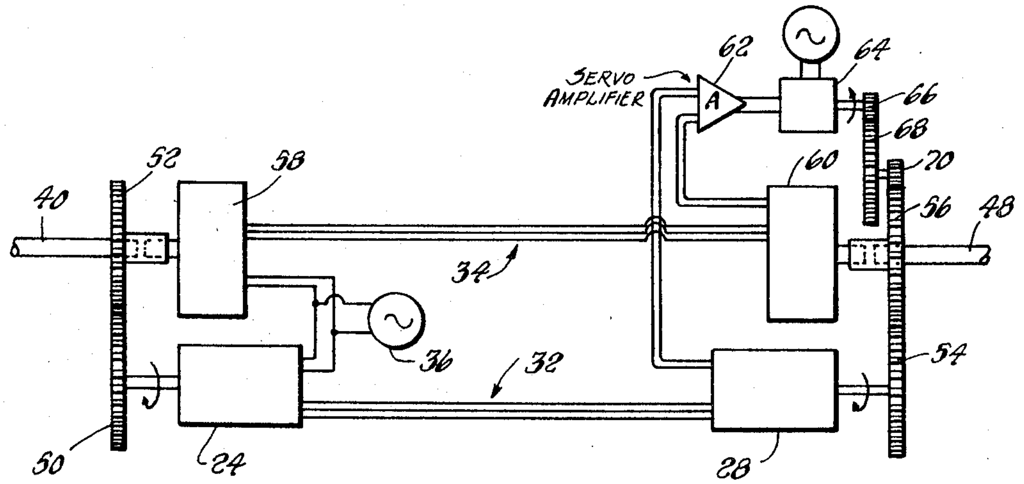
Figure 5:
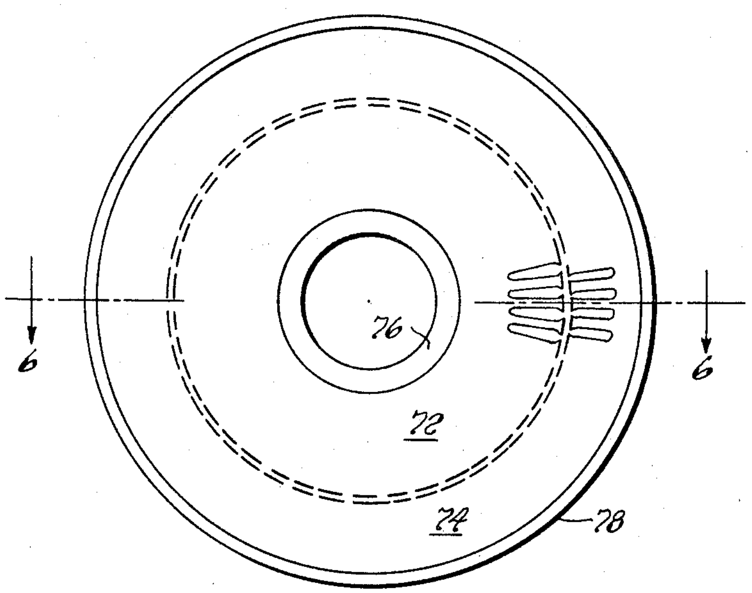
Figure 6:
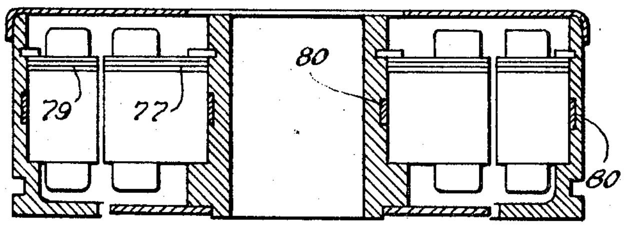
Figure 9:
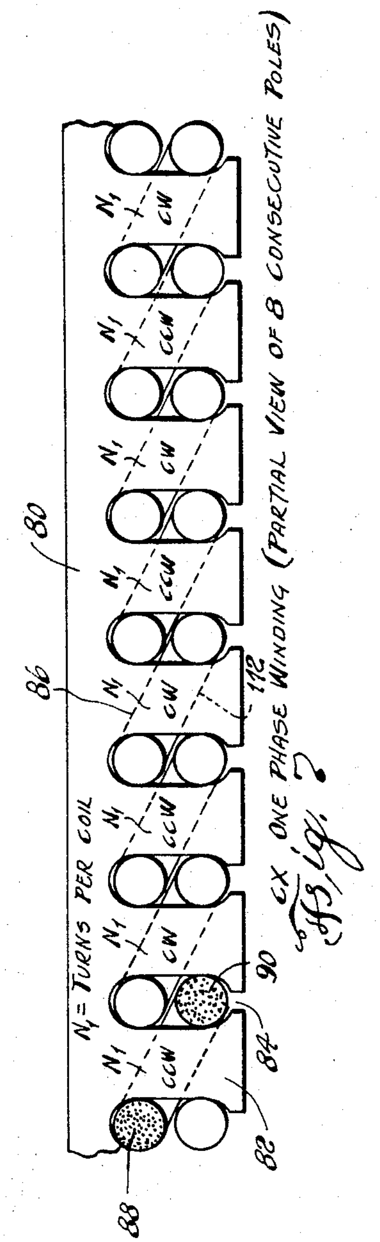
Figures 10, 11:
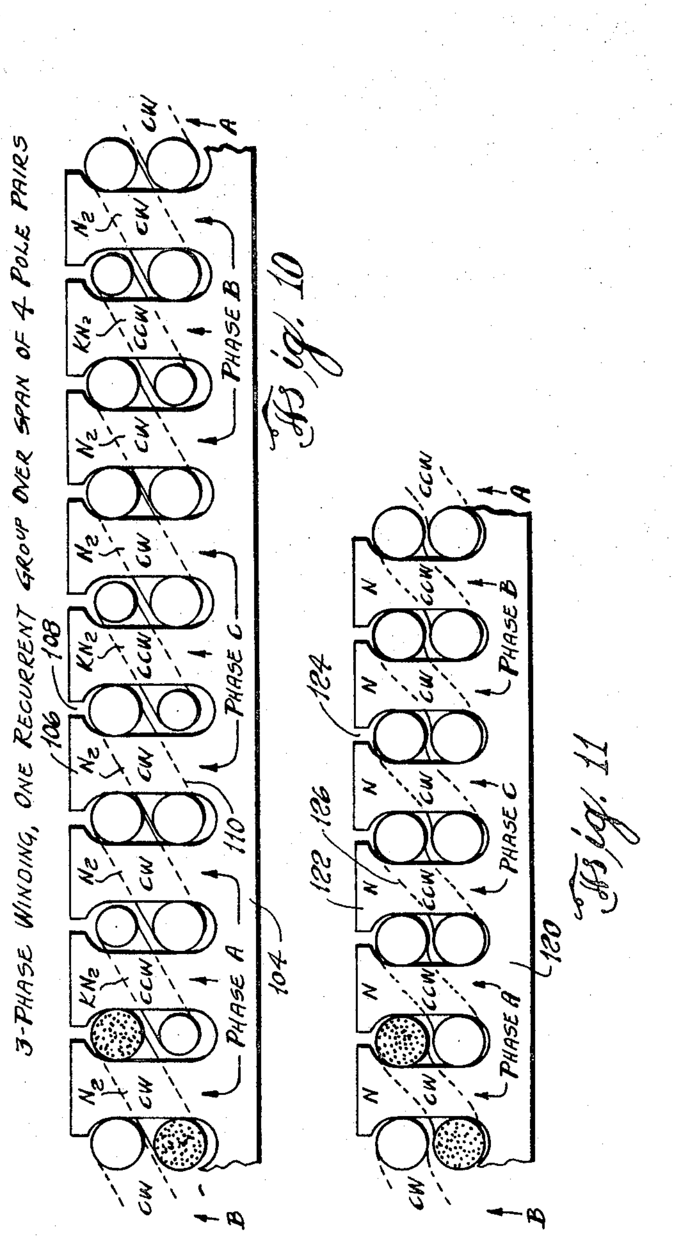
Figure 8:
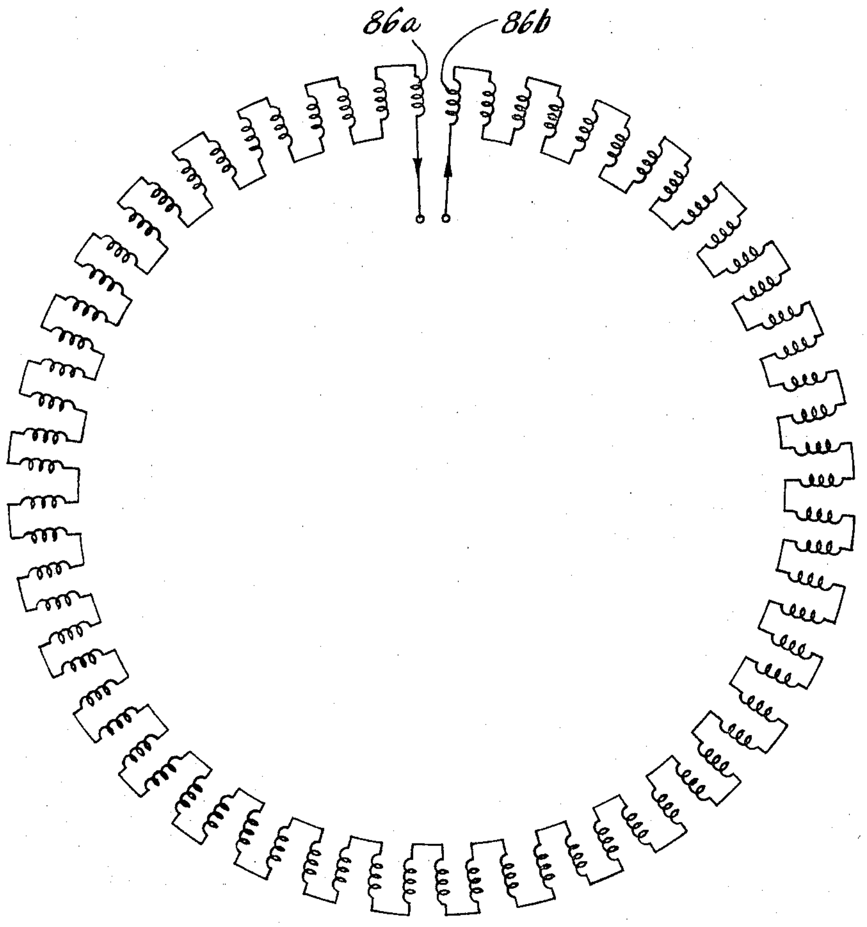
Figure 9:
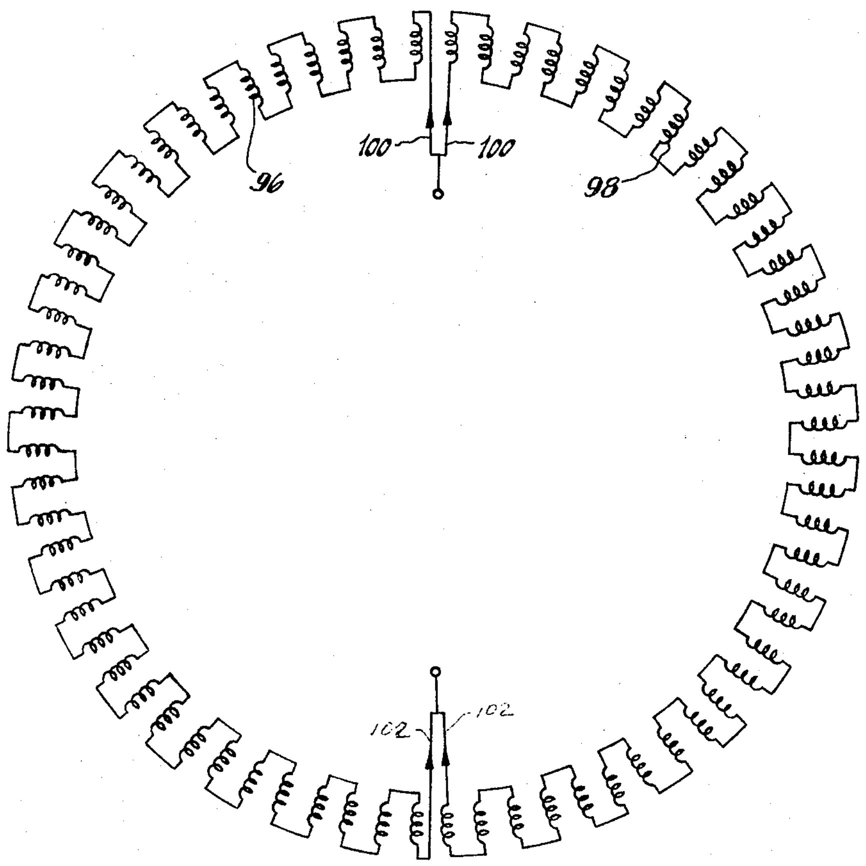
Figure 12:
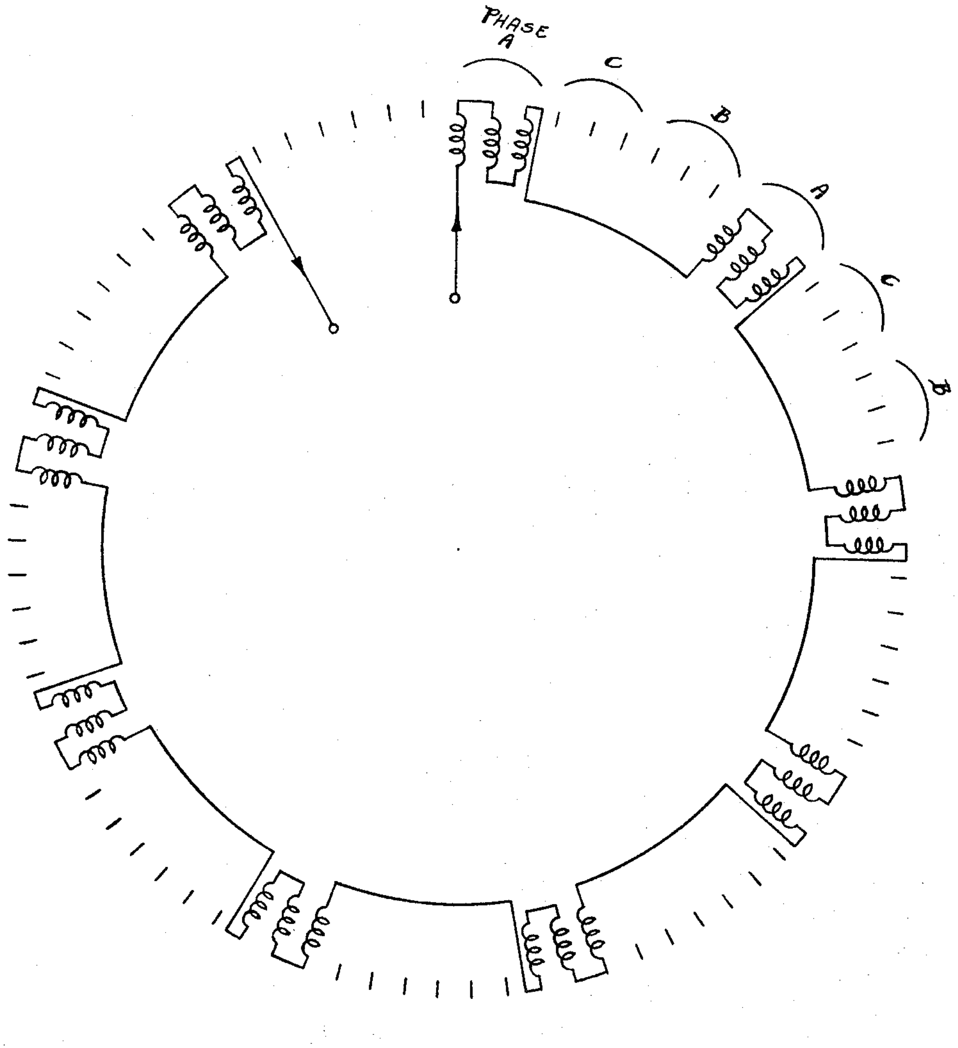

FIG. 3 is a combined mechanical and electrical block diagram of a dual speed synchro system employing two-pole synchros, FIG. 4 is a combined mechanical and electrical block diagram of an improved dual speed synchro system embodying teachings of this invention, FIG. 5 is an end view of an N speed synchro in accordance with this invention, FIG. 6 is a cross-section view taken along line 6—6 of FIG. 5, FIG. 7 illustrates in developed form a sector of the one-phase core and winding for transmitter or receiver embodying features of this invention, FIG. 8 is a wiring diagram of the one-phase member in FIG. 7 for a receiver, FIG. 9 is a wiring diagram of the one-phase member in FIG. 7 for a transmitter, FIGS. 10 and 11 illustrate in developed form sectors of two embodiments of 3 phase cores and windings for transmitter or receiver embodying features of this invention; the approximately perpendicular relationship of 3-phase windings in FIGS. 10 and 11 to the one-phase winding in FIG. 7 is the relationship at assembly and FIG. 12 is a wiring diagram of one of the three-phases in an 81 slot three phase core as in FIG. 10 wherein there are nine recurrent groups per phase.

In FI1. 1 there is shown the conventional basic synchro winding including a one-phase winding 10 and a three-phase winding 12, mounted on respective cores, not shown, that are coaxial and relatively rotatable. In the synchro transmitter the one-phase winding functions as a transformer primary when energized by a sinusoidal power supply 14 and the 3-phase winding 12 functions as the secondary. The receiver is similar to the transmitter but the one-phase winding is the secondary and the 3-phase winding is the primary. The rotor may carry the one-phase winding or the 3-phase winding. In the transmitter, if the stator carries the one-phase winding, the synchro operates cooler because the heat produced by the primary is dissipated more readily than if the rotor carries the one-phase winding. On the other hand, a variable brush contact resistance on the slip rings may cause errors when the rotor carries the three-phase winding, yet have no effect when the rotor carries the one-phase winding. Generally the rotor carries the one-phase winding, but this invention applies equally well to synchros wherein the rotor carries either the one-phase winding or the 3-phase winding.

Figure 1:
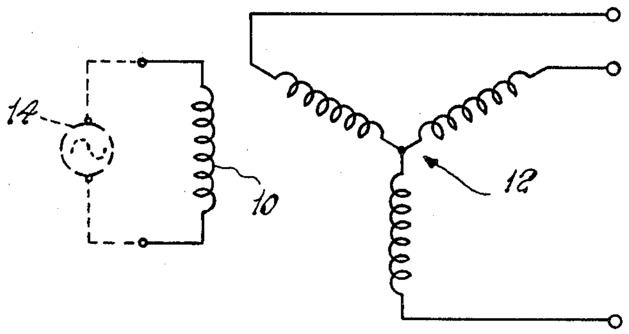
FIG. 1 is a schematic of a conventional synchro primary and a secondary.
Figure 2:
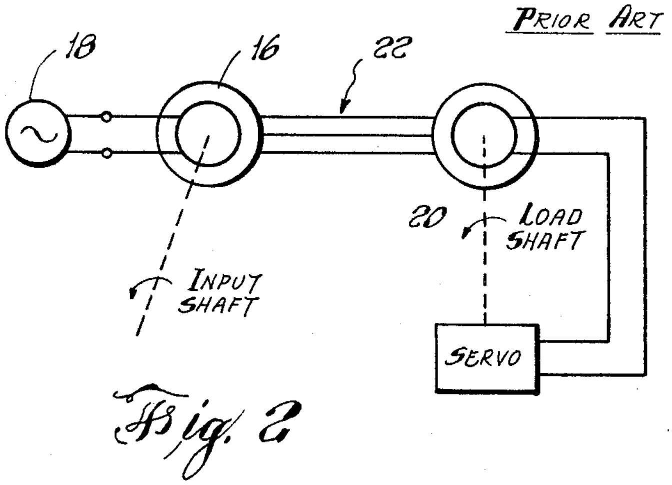
FIG. 2 is a schematic of a conventional one speed synchro system.

In FIG. 2, there is shown a conventional basic one-speed synchro system having a two-pole transmitter 16 energized by a sinusoidal source 18 coupled to a servoed two-pole receiver by a cable 22 which may be hundreds of feet long. The receiver shaft is servoed to turn in step with the transmitter shaft within the accuracy limitation of the transmitter, the receiver, the coupling cable and the servo drive. In such a system, the angular position error between the transmitter shaft and the receiver shaft may exceed one-half degree especially under continuous or reversing rotation. A dual speed system as in FIG. 3 has better accuracy than the one-speed prior art system in FIG. 2 even though employing similar two-pole synchros. This system includes two synchro transmitters 24 and 26 and two synchro receivers 28 and 30 similar to those in FIG. 2. Coupling cables 32 and 34 join transmitter 24 to receiver 28 and transmitter 26 to receiver 30. The primaries of the transmitters 24 and 26 are connected to sinusoidal power supply 36. The rotors of the transmitters and an input shaft 40, e.g. from a gyrocompass, are mechanically linked by a gear train 38 for 1:1 relationship between the input shaft and the rotor of the synchro 24 and for a 1:$N$ relationship between the input shaft and the rotor of the synchro 26 whereby any angular displayement $\theta$ of the input shaft 40, the rotor of the transmitter 24 is displaced by an angle $\theta$ and the rotor of the transmitter 26 is displaced by an angle $N\theta$. The outputs of the secondaries of the two receivers 28 and 30, through servo electronics 42 obtainable commercially, provide directional control of servo motor 44 for the purpose of turning the load shaft 48 to the same angular position as the input shaft 40. For this angular correlation between shafts, a gear train 46 mechanically couples the rotor of the receivers 28 and 30, the rotor of the sermomotor 44, and the output or load shaft 48, for 1:1 relation between the rotor of receiver 28 and the load shaft 48 and for *N*:1 relationship betwen the rotor of receiver 30 and the load shaft. In this system the synchros 26 and 30 are said to operate at N speed and they serve as vernier devices whereby the load shaft 48 follows the input shaft 40 with substantially greater accuracy than is realized with the system shown in FIG. 2.

In FIG. 3, the function of the one-speed system of synchros 24 and 28 is limited to the initial stage of servo control where the load shaft 48 is driven to an approximate position angle of the input shaft 40 before the N-speed system takes final and moer accurate control. The accuracy thus attained is brought within the range of the 4 to 6 mintues of arc, with the gear train contributing the predominant part of the system error.

The system shown in FIG. 4 embodies teachings of this invention. Whereas the synchro system in FIG. 3 includes two-pole synchros 26 and 30, with their respective *N*:1 gear trains, the sytem in FIG. 4 includes multipolar synchros 58 and 60, each having N pairs of poles, with the transmitter 58 directly coupled to the input shaft and the receiver 60 directly coupled to the load shaft. The remaining components of the systems of FIGS. 3 and 4 are similar. The primaries of the synchro transmitters are energized by a sinusoidal source 36. The secondaries of the one-speed receiver 28 and of the N-speed receiver 60 feed the servoamplifier 62 and they provide directional control of servomotor 64 as in the system of FIG. 3.

The error in a system as in FIG. 4 is a fraction of the error of the FIG. 3 system. In FIG. 3, the gear trains introduce error due to manufacturing inaccuracies and backlash. For an analysis of the system error of FIG. 3, let the transmission error of the gear train 38 between the input shaft and the rotor of transmitter synchro 26 be $E_{g1}$ and the transmission error of the gear train 46 between the output shaft and the rotor of receiver synchro 30 be $E_{g2}$. $E_{g1}$ and $E_{g2}$ are referred to scale of input and output shaft angle $\theta$. The transmitter synchro 26 and receiver synchro 30 introduce inherent errors $E_{cx}$ and $E_{ct}$ respectively. $E_{cx}$ is the error of the transmitter synchro 26 referred to its own angular rotation $N\theta$ expressed in terms of mechanical angle minus electrical angle. $E_{ct}$ is the error of the receiver synchro 30 referred to its own angular rotation $N\theta$ expressed in terms of mechanical angle minus electrical angle at null output. The servoamplifier and servomotor introduce error $E_s$ which is the angle between the rotor of receiver 30 and its true null position (referred to $N\theta$). For the preceding error components, the resultant system error $E_t$ between the position angle of the output shaft and of the input shaft is $$E_t = \theta \text{ out} - \theta \text{ in} = E_{g1} - E_{g2} + \frac{E_{ct} - E_{cx} + E_s}{N}$$

The component errors do not exhibit the same pattern of variation with rotation. The errors in the preceding equation may be referred to amplitudes of sinusoidally varying errors. Therefore the effective (RMS) values of the system error is $$E_t(\text{eff}) = \frac{1}{\sqrt{2}}\sqrt{E_{g1}^2 + E_{g2}^2 + \frac{1}{N^2}(E_{ct}^2 + E_{cx}^2 + E_s^2)}$$

A numerical example of the errors normally encountered in the system shown in FIG. 3 is as follows:

$E_{g1} \approx E_{g2} \approx \pm 3$ minutes of arc max. error referred to $\theta$.
$E_{ct} \approx E_{cx} \approx \pm 6$ minutes of arc max. error referred to own shaft angle $N\theta$.
$E_s \approx \pm 12$ minutes of arc max. referred to $N\theta$.

whereby $E_t(\text{eff}) \approx 3.014$ minutes of arc RMS. The result shows that the errors from the synchros and servo drive contribute a minor percentage of the total error inherent in the system of FIG. 3. Most of the error is contributed by the gear train. Eliminating the gears between input shaft and vernier transmitter and between output shaft and vernier receiver as in the system in FIG. 4 results in a very high percentage reduction in the total error. Though the system of FIG. 4 is more accurate than the system of FIG. 3, it is advantageous to reduce error as close to zero as possible. The accuracy of a transmission system as in FIG. 4 is dependent on the accuracy of the multipolar transmitters and receivers and also on the degree to which the system is immune to error in the transmission cable by impedance imbalance in the three lines of the transmission cable and by inductive and capacitive coupling between the transmission lines and neighboring lines operating at the same supply frequency. In the systems of FIG. 2 and FIG. 3, transmission cable error constituted a minor portion of the total error. However, in the system of FIG. 4, these errors constitute a significant portion of the total error. The degree of immunity of the system of FIG. 4 to these errors improves with increase in level of transmission voltage, steepening of voltage gradient of receiver error signal (i.e. voltage *v.* angle off null), lowering of supply frequency for the system, lowering of transmitter impedance and increase in receiver impedance, and more significantly, with increased number of poles in the vernier synchros.

Synchros having N pairs of poles are termed N speed synchros because the electrical angle defined by their characteristic voltages is N times their shaft mechanical angle.

The N speed synchros shown in FIGS. 5 and 6 includes rotor and stator cores 72 and 74 secured to rotor core support member 76 and stator core support member 78 respectively. Each of the cores include a stack of laminations 77 and 79 with uniformity distributed slots and teeth. At assembly the laminations are cemented together into cores with the selected slot skew, if any. The inside diameter of the rotor core and the outside diameter of the stator core is formed for a snug fit on the rotor and stator support members 76 and 78. At assembly, cement is included between the engaging surfaces of the cores and their support members. The support members may be formed with annular undercuts 80 to receive cement for more efficient joinder. The cores seat against locating shoulders and may be locked against axial displacement by conventional arcuate spring members that seat in annular slots adjacent the ends of the cores.

The lamination material is chosen on the basis of high permeability and low core loss for minimum power loss, and attendant temperature rise. Allegheny-Ludlum #4750 and Carpenter Steel #49 are examples of commercial lamination material satisfactory for this purpose. Allegheny-Ludlum #4750 is 48% nickel and 52% iron; Carpenter Steel #49 is 49% nickel and 51% iron. These materials have a linear coefficient of expansion equal to $8.4 \times 10^{-6}$ in./in./° C.

The material for the support members 76 and 78 has essentially the same temperature coefficient of expansion as the lamination material together with mechanical strength and noncorrosive properties similar to those of stainless steel. A commercial material exceptionally suited to this purpose is a titanium alloy described in an article printed in Design News, Sept. 29, 1961, p. 65–87, specifically table 46 of p. 83 of that article which is essentially 8% aluminum, 10% molybdenum, 1% vanadium, and the remainder titanium. This material has substantially the same coefficient of expansion as the lamination material described above, the strength and non-corrosive properties of stainless steel plus the additional advantage of lower density than steel. By using a material for the support members having essentially the same temperature coefficient of expansion, virtually no synchro error arises from lamination stresses caused by temperature variation.

The following structural details of this invention each contribute to highest possible accuracy and to advantageous operational levels of voltage, power and impedance. These structural details are particularly significant in smaller size synchros, less than 5 inch housing diameter.

*Radial air gap*

The radial air gap is 8 to 10 mils which is longer than in conventional two pole synchros. A still longer air gap can reduce still further slot harmonic errors, air gap eccentricity errors and null voltages, but at the price of substantial problems raised by the necessary increase in power level or reduction in impedance level, particularly in smaller size synchros.

*Slot opening in transmitter primary*

Consecutive poles of opposite polarity are separated by a relatively narrow slot. The slot opening in the transmitter primary is 4 to 5 times the length of the radial air gap to minimize, insofar as is practical, the leakage flux through the narrow slot. The slot opening fixes the arc span of each pole and its associated flux distribution whence the primary harmonics are determined by conventional methods.

*Secondary slot opening*

The secondary slot opening in transmitter and receiver are no larger than 20 mils. They are made as much smaller than 20 mils as is practical consistent with fabrication limitations. Minimum secondary slot opening minimizes slot harmonic errors caused by reluctance variation under the poles during rotation. Thus the core member with small slot opening is the 3-phase member in the transmitter and the one-phase member in the receiver.

*Laminated skew*

Helical skew of either the stator or rotor stack is very effective in reducing slot harmonics as well as higher order harmonics. In a synchro having straight, non-shaped poles, the selective skew between rotor and stator is equal to one slot pitch of the 3-phase member. In a synchro having shaped poles lesser skew is equally effective.

*Relative number of slots in primary and secondary cores*

For a minimal size N-shaped synchro, the one-phase core is limited to one tooth per pole and one coil per slot pitch. The number of slots in the 3-phase core bears the following relation to the number of slots in the one-phase core. Let $S_1$ be the decided upon number of poles (and slots) in the one-phase core, and let $S_3$ be the tentative number of poles (and slots) in the 3-phase core. The ratio $S_3/S_1$ reduced to lowest terms must yield a numerator that is an integral multiple of 3.

In other words, where $$\frac{S_3}{S_1}=\frac{kn_3}{kn_1}=\frac{n_3}{n_1}$$

the number $n_3$ must be an integral multiple of 3 to yield balanced groups of coils in the 3-phase winding. The common factor $k$ defines the number of repetitive groups of coils over the entire core periphery. The accuracy of the 3-phase winding improves with higher numerical values of $n_3$.

The recurrent groups of coils have a beneficial averaging effect in reducing error resulting from manufacturing imperfections such as non-uniform spacing of lamination slots, rotor eccentricity, out of roundness, etc., and the beneficial averaging effect improves with increase in $k$. Otherwise stated, errors in the voltage components in the recurrent groups caused by manufacturing imperfections vary in relative magnitude and sign but the total output voltage benefits by the averaging action.

EXAMPLE 1

72 pole one-phase core
81 slot 3-phase core $$\frac{S_3}{S_1}=\frac{81}{72}=\frac{(9)}{(9)}\frac{(9)}{(8)}$$

$$n_3=9 \qquad k=9$$

EXAMPLE 2

72 pole one-phase core
54 slot three-phase core $$\frac{S_3}{S_1}=\frac{54}{72}=\frac{(18)}{(18)}\frac{(3)}{(4)}$$

$$n_3=3$$

$$k=18$$

In Example 1 the 81 slot core permits the use of a more accurate winding than the 54 slot winding but the 54 slot winding has a better averaging effect on errors resulting from manufacturing imperfections.

*Windings*

A one-phase winding for the transmitter primary and the receiver secondary in accordance with this invention is illustrated in FIG. 7, wound on core 80, shown in developed form, having identical teeth 82, and identical slots 84, within selected tolerance imits. The winding 86 includes one coil for each tooth 82. Therefore there are two coil sides in each slot. All coils have the same number of turns $N_1$ and each coil surrounds one tooth. One coil side of each coil occupies the radially inward position of a slot and the other coil side of the same coil occupies the radially outward position of the next slot. The coils and coil sides are in the same relationship around the core. Relative to the connections among the coils, the turns of coils on successive teeth are alternately clockwise and counter-clockwise as indicated by the legends $C\omega$ and $CC\omega$ in FIG. 7. In the receiver one-phase member of FIG. 8 all of the coils are in series and the ends 92 and 94 of the series-connected coils extend from coils sides **86*a* and 86*b* in the same slot. The output voltage is generally low, normally near nul, so that there is no significant insulation prolbem in the slot that nests the coil sides from which the ends 92 and 94 extend. However, in the transmitter one-phase member of FIG. 9, the coils half-way around the core are connected in series and the coils around the remainder of the core are connected in series. The two sets of series-connected coils are connected in parallel; in two diametrically opposed slots, ends 100 and 102** of the two coil sides in the respective slots are connected in common for connection to the energizing source. With this arrangement, the voltage difference between coil sides in every slot is approximately the same, being equal to the energizing voltage divided by one-half the number of coils. Were it connected as in FIG. 8, there would be fully supply voltage across coil sides within one slot.

The winding for the three-phase core 104 of the synchro includes one coil for each tooth 106 and each slot 108 nests two coil sides. In the assembled synchro, the slope of the ends of coils 110 and the three-phase winding is opposite to the slope of the ends of coils of the one-phase winding 112. Therefore, contiguous coil ends on rotor and stator are approximatey in perpendicular planes thereby reducing inductive effect of leakage flux from the coil ends.

FIG. 7 and FIG. 10 illustrate the relationship of one-phase and three-phase windings for a synchro wherein the one-phase core has 72 teeth and the three-phase core has 81 teeth. As previously explained, the number of recurrent groups is 9, the largest number divisible into 72 and 81, and each recurrent group spans 8 poles. Eight poles (72 divided by 9) are shown in FIG. 7 and one recurrent group spanning 9 teeth (81 divided by 9), three teeth per phase, is shown in FIG. 10 and in line with and in proper proportion to coextend with the eight poles. Of the three coils of each phase in each recurrent group, the two outer coils have an equal number of turns $N_2$ and the intermediate coil has $kN_2$ turns where $k$ is less than one. Selected lower harmonics (e.g. 5th and 7th) may be further reduced in amplitude by judicious choice of the numerical value for $k$. The following relationship governs the choice of $k$ in the case of the transmitter where the primary harmonics of order $r$ are reduced by the 3-phase secondary in accordance with relation $$\frac{Kr}{K_1}=\frac{[k+2\cos(r20)]\frac{1}{r^2}\sin(r80^\circ)\sin\left(r\frac{\pi}{2}\frac{S}{\tau}\right)}{[k+2\cos 20]\sin 80\sin\left(\frac{\pi}{2}\frac{S}{\tau}\right)}$$

where:

$\frac{Kr}{K_1}$=relative reduction factor of $r$th harmonic $S/\tau$=skew to pole pitch ratio The number of coils per phase per recurrent group is not limited to three as in FIG. 10. There may be two or more coils per phase per recurrent group. An example of the former is shown in FIG. 11 comprising a core 120, having teeth 122, slots 124, and one coil 126 for each tooth. The three-phase core 120 has six teeth for every five teeth in the one-phase core, e.g. 50 teeth on the one-phase core and 60 teeth on the three phase core. In FIG. 11, all the coils have the same number of turns because proportioning of turns to rduce harmonics requires three or more coils per phase per recurrent group.

Each of the recurrent groups of each phase in the three-phase core are connected in additive series as illustrated in FIG. 12. Only phase A of phases A, B, and C are shown. The other two phases are similarly connected. In the transmitter, the total output voltage of each phase is the sum of approximately equal voltage components. Differences among the voltage components caused by manufacturing imperfections are averaged.

It will be understood that various changes in the details, materials and arrangements of parts (and steps), which have been herein described and illustrated in order to explain the nature of the invention, may be made by those skilled in the art within the principle and scope of the invention as expressed in the appended claims.

I claim:

1. A multipseed synchro comprising:

a rotor core and a stator core having a common axis and being relatively rotatable about that axis, one of said cores having $S_1$ essentially identical slots and teeth and coils, each of said $S_1$ coils being assembled around one only of said teeth respectively, all of said coils having the same orientation relative to the axis, the other of said cores having $S_3$ essentially identical slots and teeth and coils, each of the $S_3$ coils being assembled around one only of the $S_3$ teeth respectively, $S_1$ and $S_3$ being whole numbers that are different and have a relationship such that they have a common factor greater than 1 and when divided by the common factor, one of $S_1$ and $S_3$ is further divisible by 3.

2. A multispeed synchro as defined in claim 1, wherein the ends of the coils on the respective cores are approximately mutually perpendicular.

3. A synchro system comprising:

(a) a one-speed transmitter synchro, a one-speed receiver synchro, and an electrical cable coupling the secondary of the transmitter synchro and the primary of the receiver synchro, (b) an N-speed transmitter synchro, and an N speed receiver synchro and an electrical cable coupling the secondary of N speed transmitter synchro and the primary of the N speed receiver synchro, (c) means connecting the primaries of the transmitter synchros in parallel for connection to a sinusoidal power supply, (d) means mechanically linking the rotors of the transmitters for rotation in 1:1 relationship and for connection to an input shaft, (e) means mechanically linking the rotors of the receiver synchros for rotation in 1:1 relationship and for connection to an output shaft, (f) a servoamplifier electrically coupled to the secondaries of said receiver synchros, (g) a servomotor electrically coupled to the same power supply as the transmitter synchros and to the output of the servoamplifier whereby the servomotor turns the output shaft to the same position angle as the input shaft.

4. A synchro system as defined in claim 3 wherein each N-speed synchro has a core with $S_1$ teeth and $S_1$ coils, wherein each $S_1$ tooth is surrounded by one $S_1$ coil, and a core with $S_3$ teeth and $S_3$ coils, wherein each $S_3$ tooth is surrounded by one $S_3$ coil and wherein if $S_1$ and $S_3$ are divided by the largest whole number divisor common to both, one of the two quotients is further divisible by 3.

References Cited

UNITED STATES PATENTS

| | | | |
|---|---|---|---|
| 1,371,096 | 3/1921 | Howe et al. | 310—49 XR |
| 2,535,914 | 12/1950 | Glass | 310—49 XR |
| 2,550,663 | 5/1951 | Bechberger et al. | 310—49 XR |
| 2,578,988 | 12/1951 | West. | |

BENJAMIN DOBECK, *Primary Examiner.*